(12) United States Patent
Wang et al.

(10) Patent No.: US 10,347,988 B2
(45) Date of Patent: Jul. 9, 2019

(54) WIRELESS MOBILE DEVICE

(71) Applicant: Huawei Technologies Co., Ltd., Shenzhen (CN)

(72) Inventors: Hanyang Wang, Reading (GB); Hongyu Wang, Shenzhen (CN); Huiliang Xu, Shenzhen (CN); Shuwen Lyu, Shanghai (CN); Chien-Ming Lee, Shanghai (CN); Lei Wang, Shanghai (CN); Lina Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/523,227

(22) PCT Filed: Oct. 31, 2014

(86) PCT No.: PCT/CN2014/090091
§ 371 (c)(1),
(2) Date: Apr. 28, 2017

(87) PCT Pub. No.: WO2016/065630
PCT Pub. Date: May 6, 2016

(65) Prior Publication Data
US 2017/0331189 A1 Nov. 16, 2017

(51) Int. Cl.
*H04M 1/00* (2006.01)
*H01Q 5/371* (2015.01)
(Continued)

(52) U.S. Cl.
CPC .............. *H01Q 5/371* (2015.01); *H01Q 1/243* (2013.01); *H01Q 5/378* (2015.01); *H01Q 9/04* (2013.01); *H01Q 13/10* (2013.01); *G01S 19/13* (2013.01)

(58) Field of Classification Search
CPC . H04M 1/0277; H04M 1/185; H01P 1/20381; H01P 3/081; H01P 3/121;
(Continued)

(56) References Cited

U.S. PATENT DOCUMENTS

| 2002/0145569 A1 | 10/2002 | Onaka et al. |
| 2004/0125030 A1 | 7/2004 | Sung et al. |

(Continued)

FOREIGN PATENT DOCUMENTS

| CN | 1380721 A | 11/2002 |
| CN | 1508907 A | 6/2004 |

(Continued)

*Primary Examiner* — Tu X Nguyen
(74) *Attorney, Agent, or Firm* — Leydig, Voit & Mayer, Ltd.

(57) ABSTRACT

The present embodiments disclose a wireless mobile device, including a metal frame, a circuit board disposed in the metal frame, where there is a slot between at least one side edge of the circuit board and the metal frame, a first grounding point is connected to the circuit board and the metal frame, a second grounding point is connected to the circuit board and the metal frame, and a feeding point is located between the first grounding point and the second grounding point and is connected to the circuit board and the metal frame; and each antenna open-circuit stub suspends in space on an outer side of the circuit board, one end is connected to the metal frame by crossing the slot, and a connection point of the antenna open-circuit stub and metal frame is located between the feeding point and the second grounding point.

16 Claims, 3 Drawing Sheets

(51) Int. Cl.
*H01Q 9/04* (2006.01)
*H01Q 1/24* (2006.01)
*H01Q 13/10* (2006.01)
*H01Q 5/378* (2015.01)
*G01S 19/13* (2010.01)

(58) Field of Classification Search
CPC .......... H01P 5/107; H01P 7/082; H05K 5/03; H05K 13/0023; H05K 1/0215; H05K 2201/0715
USPC ...................................................... 455/562.1
See application file for complete search history.

(56) References Cited

U.S. PATENT DOCUMENTS

| | | |
|---|---|---|
| 2009/0066596 A1 | 3/2009 | Fujishima et al. |
| 2009/0153407 A1 | 6/2009 | Zhang et al. |
| 2011/0001673 A1* | 1/2011 | You .................. H01Q 1/243 343/702 |
| 2014/0184449 A1* | 7/2014 | Dong ................ H01Q 13/106 343/702 |

FOREIGN PATENT DOCUMENTS

| | | |
|---|---|---|
| CN | 101938033 A | 1/2011 |
| CN | 202977704 U | 6/2013 |
| CN | 103296385 A | 9/2013 |
| EP | 1439606 A1 | 7/2004 |

* cited by examiner

WIRELESS MOBILE DEVICE

CROSS-REFERENCE TO RELATED APPLICATIONS

This application is a National Stage of International Application No. PCT/CN2014/090091, filed on Oct. 31, 2014, which is hereby incorporated by reference in its entirety.

TECHNICAL FIELD

The present invention relates to the field of communications technologies, and in particular, to a wireless mobile device.

BACKGROUND

In the field of communications technologies, a wireless mobile device has advantages such as portability. Especially for a mobile device such as a mobile phone, in pursuit of a more beautiful appearance, in addition to a compact size of the entire machine, more metal components are applied to design of the wireless mobile device.

However, in the wireless mobile device, introduction of the metal components improves beauty of wireless mobile device appearance, and meanwhile causes great impact on performance of an antenna in the wireless mobile device.

As shown in FIG. 1, FIG. 1 is a schematic structural diagram of a mobile phone provided with an antenna in the prior art. The mobile phone shown in FIG. 1 includes a metal frame 01, a circuit board 02 located in the metal frame 01, and a slot 012 formed between the metal frame 01 and the circuit board 02. Design of a primary antenna, a diversity antenna, and a GPS antenna in the foregoing mobile phone is as follows: Resonance is generated by the slot 012 between the metal frame 01 and the circuit board 02, and then a resonance frequency of a slot antenna is controlled by disposing a grounding point 03 and a feeding point 04 at different positions in the slot 012.

In the prior art, the slot 012 controls the resonance frequency by controlling positions of the grounding point and the feeding point, but the generated resonance frequency is a main frequency and harmonic of the slot 12, which can generally be used only for designing an antenna of a single frequency band.

SUMMARY

The present invention provides a wireless mobile device, and the wireless mobile device has at least one slot antenna that can meet working requirements of multiple operating frequency bands, which improves compactness of a structure of the wireless mobile device.

According to the first aspect, a wireless mobile device is provided, including a metal frame and a circuit board disposed in the metal frame, where there is a slot between at least one side edge of the circuit board and the metal frame, and further including a first grounding point, a second grounding point, a feeding point, and at least one antenna open-circuit stub, where:

the first grounding point is connected to the circuit board and the metal frame, the second grounding point is connected to the circuit board and the metal frame, and the feeding point is located between the first grounding point and the second grounding point and is connected to the circuit board and the metal frame; and each antenna open-circuit stub suspends in space on an outer side of the circuit board, one end is connected to the metal frame by crossing the slot, and a connection point of the antenna open-circuit stub and the metal frame is located between the feeding point and the second grounding point.

With reference to the foregoing first aspect, in a first possible implementation manner, the at least one antenna open-circuit stub includes a first antenna open-circuit stub and a second antenna open-circuit stub, where a connection point of the first antenna open-circuit stub and the metal frame is located between the feeding point and the second grounding point, a connection point of the second antenna open-circuit stub and the metal frame is located between the second grounding point and the connection point of the first antenna open-circuit stub and the metal frame.

With reference to the first possible implementation manner of the foregoing first aspect, in a second possible implementation manner, an electrical length of the first antenna open-circuit stub is a half of an electrical length between the first grounding point and the connection point of the first antenna open-circuit stub and the metal frame.

With reference to the first possible implementation manner of the foregoing first aspect, in a third possible implementation manner, an electrical length of the second antenna open-circuit stub is a half of an electrical length between the first grounding point and the connection point of the second antenna open-circuit stub and the metal frame.

With reference to the foregoing first aspect, in a fourth possible implementation manner, a width of the slot is greater than or equal to 0.5 mm.

With reference to the foregoing first aspect, the first possible implementation manner of the first aspect, the second possible implementation manner of the first aspect, the third possible implementation manner of the first aspect, or the fourth possible implementation manner of the first aspect, in a fifth possible implementation manner, that the feeding point is located between the first grounding point and the second grounding point and is connected to the circuit board and the metal frame includes:

the feeding point has a strip structure, one end of the feeding point is connected to the circuit board, and the other end is connected to the metal frame.

With reference to the foregoing first aspect, the first possible implementation manner of the first aspect, the second possible implementation manner of the first aspect, the third possible implementation manner of the first aspect, or the fourth possible implementation manner of the first aspect, in a sixth possible implementation manner of the first aspect, that the feeding point is located between the first grounding point and the second grounding point and is connected to the circuit board and the metal frame includes:

the feeding point has a ring structure, and the feeding point is disposed on the circuit board and is coupled to the metal frame.

In the wireless mobile device provided in the foregoing first aspect, a first grounding point may cooperate with a second grounding point, a feeding point, a section that is of a slot and located between the first grounding point and the second grounding point, a metal frame, and a circuit board, so that a slot antenna of a first operating frequency band can be formed. In addition, each antenna open-circuit stub cooperates with the first grounding point, the feeding point, a section that is of the slot and located between the first grounding point and a connection point of the antenna open-circuit stub and the metal frame, the metal frame, and the circuit board, so as to form an antenna of another resonance frequency. Therefore, in the foregoing wireless mobile device, both the first operating frequency band and another operating frequency band form effective resonance by using the slot between the circuit board and the metal frame, and radiation efficiency of an antenna is not affected by the metal frame. Therefore, radiation power of the slot antenna in the foregoing wireless mobile device is relatively high in a required operating frequency band. The slot antenna in the foregoing wireless mobile device meets working requirements of both the first operating frequency band and an operating frequency band corresponding to each antenna open-circuit stub, which improves compactness of a structure of the wireless mobile device.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
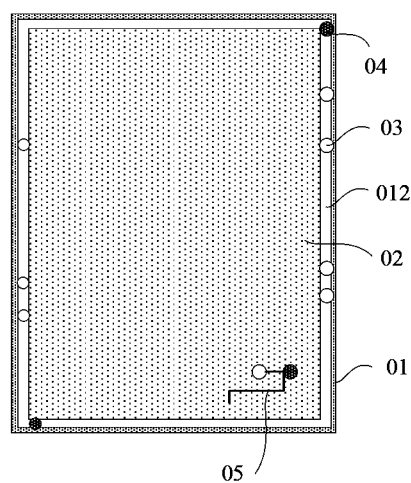
FIG. 1 is a schematic structural diagram of a wireless mobile device provided with an antenna in the prior art.
Figure 2:
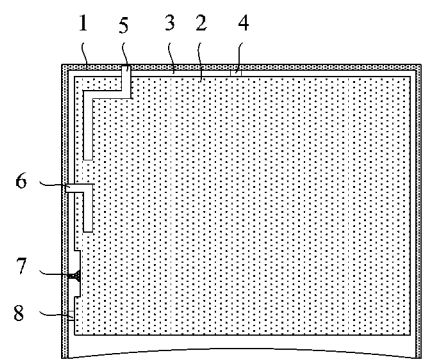
FIG. 2 is a schematic structural diagram of a wireless mobile device provided with an antenna according to the present invention.

Referring to FIG. 2, FIG. 2 is a schematic structural diagram of a wireless mobile device provided with an antenna according to an embodiment of the present invention.

As shown in FIG. 2, the wireless mobile device provided in this embodiment includes a metal frame 1 and a circuit board 2 disposed in the metal frame 1, where there is a slot 3 between at least one side edge of the circuit board 2 and the metal frame 1, and the foregoing wireless mobile device further includes a first grounding point 8, a second grounding point 4, a feeding point 7, and at least one antenna open-circuit stub, for example, a first antenna open-circuit stub 6 and a second antenna open-circuit stub 5 shown in FIG. 2.

The first grounding point 8 is connected to the circuit board 2 and the metal frame 1, the second grounding point 4 is connected to the circuit board 2 and the metal frame 1, and the feeding point 7 is located between the first grounding point 8 and the second grounding point 4 and is connected to the circuit board 2 and the metal frame 1.

In addition, each antenna open-circuit stub suspends in space on an outer side of the circuit board 2, one end is connected to the metal frame 1 by crossing the slot 3, and a connection point of the antenna open-circuit stub and the metal frame 1 is located between the feeding point 7 and the second grounding point 4.

According to a direction and a position shown in FIG. 2, there is the slot 3 between the metal frame 1 and an upper side edge and a left side edge of the circuit board 2. In this case, the first grounding point 8 is disposed at a position in the slot 3 and located between the left side edge of the circuit board 2 and the metal frame 1, and the second grounding point 4 is disposed at a position in the slot and located between the upper side edge of the circuit board 2 and the metal frame 1.

Certainly, alternatively, the foregoing slot 3 may be formed between the left side edge of the circuit board 2 and the metal frame 1, and both the first grounding point 8 and the second grounding point 4 are disposed in a slot (not shown in the figure) between the left side edge of the circuit board 2 and the metal frame 1.

In the foregoing wireless mobile device, the first grounding point 8, the feeding point 7, the second grounding point 4, the circuit board 2, the metal frame 1, and a section that is of the slot 3 and located between the first grounding point 8 and the second grounding point 4 cooperate, so as to form a slot antenna of a first operating frequency band, and a wavelength of the first operating frequency band is specifically twice of an electrical length of a section that is of the slot 3 and used to form the slot antenna of the first operating frequency band. In addition, each antenna open-circuit stub cooperates with the first grounding point 8, the feeding point 7, the circuit board 2, the metal frame 1, and a section that is of the slot 3 and located between the first grounding point 8 and a connection point of the antenna open-circuit stub and the metal frame 1, so as to form a slot antenna of an operating frequency band. A wavelength of the operating frequency band is twice of an electrical length of a section that is of the slot 3 and located between the first grounding point 8 and the connection point of the antenna open-circuit stub and the metal frame 1. Therefore, in the slot antenna in the foregoing wireless mobile device, both the first operating frequency band and another operating frequency band form effective resonance by using the slot between the circuit board and the metal frame, and radiation efficiency of the slot antenna is not affected by the metal frame. Therefore, radiation power of the slot antenna in the foregoing wireless mobile device is relatively high in a required operating frequency band. The slot antenna in the foregoing wireless mobile device can meet working requirements of both the foregoing first operating frequency band and an operating frequency band corresponding to each antenna open-circuit stub, which improves compactness of a structure of the wireless mobile device.

In an exemplary implementation manner, the at least one antenna open-circuit stub in the foregoing wireless mobile device includes the first antenna open-circuit stub 6 and the second antenna open-circuit stub 5, where a connection point of the first antenna open-circuit stub 6 and the metal frame 1 is located between the feeding point 7 and the second grounding point 4, and a connection point of the second antenna open-circuit stub 5 and the metal frame 1 is located between the second grounding point 4 and the connection point of the first antenna open-circuit stub 6 and the metal frame 1.

In addition, preferably, an electrical length of the first antenna open-circuit stub 6 is a half of an electrical length between the first grounding point 8 and the connection point of the first antenna open-circuit stub 6 and the metal frame 1. An electrical length of the second antenna open-circuit stub 5 is a half of an electrical length between the first grounding point 8 and the connection point of the second antenna open-circuit stub 5 and the metal frame 1.

For example, the first grounding point 8 cooperates with the second grounding point 4, the feeding point 7, the section that is of the slot 3 and located between the first grounding point 8 and the second grounding point 4, the metal frame 1, and the circuit board 2, so that a GPS slot antenna with a central resonance frequency of 1.575 GHz can be formed, so as to receive a GPS signal. An electrical length of the section that is in the slot 3 and located between the first grounding point 8 and the second grounding point 4 is a half wavelength of the foregoing resonance frequency in the GPS antenna. The first antenna open-circuit stub 6 cooperates with the first grounding point 8, the feeding point 7, a section that is of the slot 3 and located between the first grounding point 8 and the connection point of the first antenna open-circuit stub 6 and the metal frame 1, the metal frame 1, and the circuit board 2, so as to form a wireless local area network antenna with a resonance frequency of 5 GHz. In addition, the second antenna open-circuit stub 5 cooperates with the first grounding point 8, the feeding point 7, a section that is of the slot 3 and located between the first grounding point 8 and the connection point of the second antenna open-circuit stub 5 and the metal frame 1, the metal frame 1, and the circuit board 2, so as to form a wireless local area network antenna with a resonance frequency of 2.4 GHz.

Figure 3:
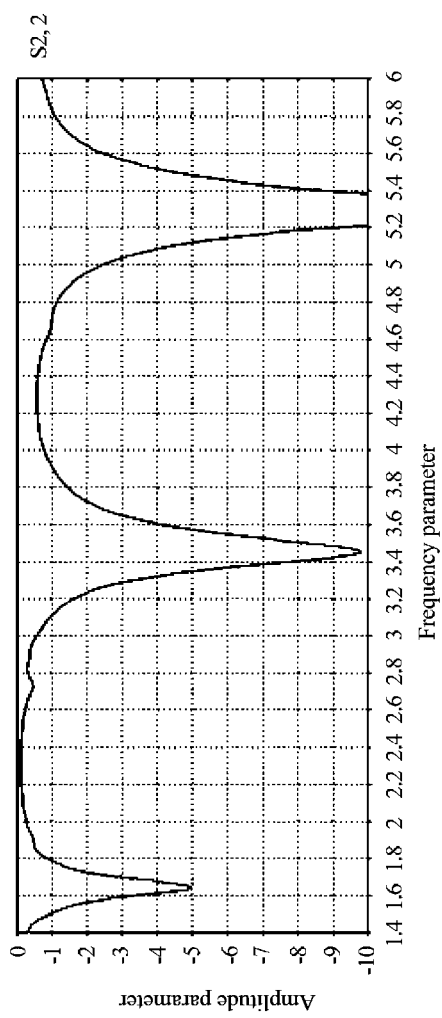
FIG. 3 is a schematic diagram of return loss when an operating frequency band of a slot antenna is 1.5 GHz.

In the foregoing wireless mobile device, the first grounding point 8 cooperates with the second grounding point 4, the feeding point 7, the section that is of the slot 3 and located between the first grounding point 8 and the second grounding point 4, the metal frame 1, and the circuit board 2, so as to form the slot antenna, where the resonance frequency of the slot antenna is 1.575 GHz. Resonance of the antenna is in a GPS frequency band, and the antenna may generate three resonances in a range from 1.4 to 6 GHz. As shown in FIG. 3, a second mode is a wavelength, a third mode is 1.5 wavelengths, and a proportion of resonance frequencies of the three resonances is nearly 1:2:3.

In the foregoing wireless mobile device, an electrical length, added in the slot 3, from the connection point of the first antenna open-circuit stub 6 and the metal frame 1 to the first grounding point 8 is a half wavelength of Wi-Fi 5 GHz, and the electrical length of the first antenna open-circuit stub 6 is a ¼ wavelength of Wi-Fi 5 GHz. In this case, because ¼ wavelength impedance transformation is performed at the first antenna open-circuit stub 6, a short circuit, that is, a high current point occurs in the connection point of the first antenna open-circuit stub 6 and the metal frame 1. For a Wi-Fi 5 GHz frequency band, the impedance transformation causes the following: An effective grounding point of the antenna moves from the second grounding point 4 to the connection point of the first antenna open-circuit stub 6 and the metal frame 1, and an effective grounding point of another frequency does not change. In this way, a size of the slot antenna is reduced in terms of electricity, and the slot antenna can generate a higher resonance frequency, that is, 5 GHz. Based on a same principle, the second antenna open-circuit stub 5 is configured to enable the antenna to generate a resonance frequency of Wi-Fi 2.4 GHz.

Figure 4:
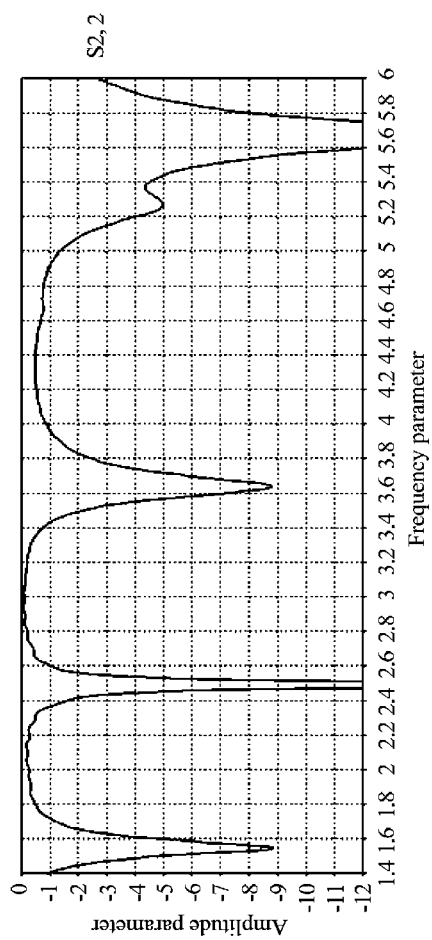
FIG. 4 is a schematic diagram of return loss of an antenna in a wireless mobile device according to the present invention.

A return loss simulation result obtained after the first antenna open-circuit stub 6 and the second antenna open-circuit stub 5 are added to the foregoing wireless mobile device is shown in FIG. 4, and a frequency band thereof covers a GPS frequency band, Wi-Fi 2.4 GHz, Wi-Fi 5.2 GHz, and 5.8 GHz, so that the antenna of the wireless mobile device can work in these frequency bands.

Preferably, based on the foregoing implementation manners, a width of the slot 3 is greater than or equal to 0.5 mm, for example, 0.5 mm, 0.55 mm, 0.6 mm, 0.7 mm, 0.75 mm, 0.8 mm, 0.9 mm, 0.95 mm, or 1 mm.

In the wireless mobile device provided in the foregoing implementation manners, there may be multiple manners for setting the feeding point 7:

As shown in FIG. 2, the feeding point 7 may have a strip structure, one end of the feeding point 7 is connected to the circuit board 2, and the other end is connected to the metal frame 1. That is, the slot antenna in the wireless mobile device may directly fed by using the feeding point 7 that has a strip structure, so that an electric field at the feeding point 7 is relatively strong.

Certainly, alternatively, the feeding point 7 may have a ring structure, and the feeding point 7 is disposed on the circuit board 2 and is coupled to the metal frame 1. That is, the slot antenna is fed by coupling.

Obviously, a person skilled in the art can make various modifications and variations to embodiments of the present invention without departing from the spirit and scope of the present invention. The present invention is intended to cover these modifications and variations provided that they fall within the scope of protection defined by the following claims and their equivalent technologies.

What is claimed is:

1. A wireless mobile device, comprising:
    a metal frame;
    a circuit board completely surrounded by the metal frame, including a slot between at least one side edge of the circuit board and the metal frame;
    a first grounding point connected to the circuit board and the metal frame;
    a second grounding point connected to the circuit board and the metal frame, wherein a spacing formed between the metal frame, the circuit board, the first grounding point and the second grounding point is a first section of the slot;
    a feeding point, located within the first section of the slot between the first grounding point and the second grounding point, is connected to the circuit board and the metal frame; and
    at least one antenna open-circuit stub extending from the metal frame towards the circuit board and overhanging the circuit board, wherein for each at least one antenna open-circuit stub, one end suspends in space on an outer side of the circuit board and another end connects to the metal frame by crossing the first section of the slot, and wherein a connection point of each at least one antenna open-circuit stub and the metal frame is located between the feeding point and the second grounding point.

2. The wireless mobile device according to claim 1, wherein the at least one antenna open-circuit stub comprises:
    a first antenna open-circuit stub; and
    a second antenna open-circuit stub, wherein a connection point of the first antenna open-circuit stub and the metal frame is located between the feeding point and the second grounding point, and a connection point of the second antenna open-circuit stub and the metal frame is located between the second grounding point and the connection point of the first antenna open-circuit stub and the metal frame.

3. The wireless mobile device according to claim 2, wherein an electrical length of the first antenna open-circuit stub is a half of an electrical length between the first grounding point and the connection point of the first antenna open-circuit stub and the metal frame.

4. The wireless mobile device according to claim 2, wherein an electrical length of the second antenna open-circuit stub is a half of an electrical length between the first grounding point and the connection point of the second antenna open-circuit stub and the metal frame.

5. The wireless mobile device according to claim 2, wherein the first antenna open circuit stub and the second antenna open circuit stub are positioned in a manner such that the wireless mobile device supports a GPS frequency band, Wi-Fi 2.4 GHz, and Wi-Fi 5 GHz.

6. The wireless mobile device according to claim 1, wherein a width of the slot is greater than or equal to 0.5 mm.

7. The wireless mobile device according to claim 1, wherein that the feeding point is located between the first grounding point and the second grounding point and is connected to the circuit board and the metal frame comprises:
the feeding point has a strip structure, wherein one end of the feeding point is connected to the circuit board, and the other end is connected to the metal frame.

8. The wireless mobile device according to claim 1, wherein that the feeding point is located between the first grounding point and the second grounding point and is connected to the circuit board and the metal frame comprises:
the feeding point has a ring structure, and the feeding point is disposed on the circuit board and is coupled to the metal frame.

9. The wireless mobile device according to claim 1, wherein the first grounding point cooperates with the second grounding point, the feeding point, and the first section of the slot to form a GPS slot antenna with a central resonance frequency of 1.575 GHz.

10. The wireless mobile device according to claim 9, wherein an electrical length of the first section of the slot is a half wavelength of the central resonance frequency of 1.575 GHz.

11. The wireless mobile device according to claim 10, wherein the GPS slot antenna generates three resonances in the range from 1.4 GHz to 6 GHz, where a proportion of resonance frequencies of the three resonances is 1:2:3.

12. The wireless mobile device according to claim 1, wherein the at least one antenna open-circuit stub comprises:
a first antenna open-circuit stub configured to cooperate with the first grounding point, the feeding point, and a first subpart of the first section of the slot to form a wireless local area network antenna with a Wi-Fi resonance frequency of 5 GHz,
wherein the first subpart of the first section of the slot is a spacing formed between the first antenna open-circuit stub, the first grounding point, the metal frame, and the circuit board.

13. The wireless mobile device according to claim 12, wherein the at least one antenna open-circuit stub further comprises:
a second antenna open-circuit stub, wherein a connection point of the first antenna open-circuit stub and the metal frame is located between the feeding point and the second grounding point, and a connection point of the second antenna open-circuit stub and the metal frame is located between the second grounding point and the connection point of the first antenna open-circuit stub and the metal frame,
wherein the second antenna open-circuit stub is configured to cooperate with the first grounding point, the feeding point, and a second subpart of the first section of the slot to form a second wireless local area network antenna with a Wi-Fi resonance frequency of 2.4 GHz,
wherein the second subpart of the first section of the slot is a spacing formed between the second antenna open-circuit stub, the first grounding point, the metal frame, and the circuit board.

14. The wireless mobile device according to claim 12, wherein an electrical length of the first subpart of the first section of the slot is a half wavelength of the Wi-Fi resonance frequency of 5 GHz.

15. The wireless mobile device according to claim 14, wherein the length of the first antenna open-circuit stub is one quarter wavelength of the Wi-Fi resonance frequency of 5 GHz.

16. The wireless mobile device according to claim 13, wherein the length of the second antenna open-circuit stub is one quarter wavelength of the Wi-Fi resonance frequency of 2.4 GHz.

* * * * *